United States Patent
Lee (10) Patent No.: US 6,760,082 B2
(45) Date of Patent: Jul. 6, 2004

(54) THIN FILM TRANSISTOR ARRAY SUBSTRATE

(75) Inventor: Deuk Su Lee, Yang Mei (TW)

(73) Assignee: HannStar Display Corp. (TW)

( * ) Notice: Subject to any disclaimer, the term of this patent is extended or adjusted under 35 U.S.C. 154(b) by 0 days.

(21) Appl. No.: 10/288,866

(22) Filed: Nov. 6, 2002

(65) Prior Publication Data

US 2004/0061809 A1 Apr. 1, 2004

(30) Foreign Application Priority Data

Sep. 30, 2002 (TW) .......................................... 91122449 A (51) Int. Cl.$^7$ ..................... G02F 1/1333; G02F 1/1343; H01L 31/20; H01L 29/15; G09G 3/36
(52) U.S. Cl. ........................... 349/42; 349/139; 257/59; 257/72; 345/92
(58) Field of Search ..................... 349/42, 139; 257/59, 257/72; 345/92

(56) References Cited

U.S. PATENT DOCUMENTS

| 5,457,553 | A | * | 10/1995 | Mori | 349/39 |
| 5,701,166 | A | * | 12/1997 | Fedorovish et al. | 349/38 |
| 5,844,647 | A | * | 12/1998 | Maruno et al. | 349/110 |
| 6,028,577 | A | * | 2/2000 | Sakamoto | 349/92 |

* cited by examiner

Primary Examiner—Tarifur R. Chowdhury
Assistant Examiner—Hoan Chau Nguyen
(74) Attorney, Agent, or Firm—Morris, Manning & Martin; Tim Tingkang Xia, Esq.

(57) ABSTRACT

A thin film transistor (TFT) array substrate has a plurality of pixel units. A plurality of signal lines and a plurality of scanning lines are formed on the substrate. Each of the plurality of paired and adjacent signal lines and each of the plurality of scanning lines are arranged in a matrix form to define each pixel unit. Each pixel unit includes at least two pixels, which are abreast of the paired and adjacent signal lines. This structure thereby provides a TFT array substrate with high aperture ratio pixel structure.

14 Claims, 9 Drawing Sheets

THIN FILM TRANSISTOR ARRAY SUBSTRATE

BACKGROUND OF THE INVENTION (A) Field of the Invention

The present invention relates in general to a thin film transistor (TFT) array substrate. In particular, the present invention relates to a TFT array substrate with high aperture ratio pixel structure.

(B) Description of Related Art

Currently, liquid crystal display (LCD), having the advantages of low power consumption, being thin type, light weight and having low driving-voltage, has been put to practical use, such as in personal computers, archival treatments, navigation systems, projectors, view finders and portable machines (watches, electronic calculators and televisions). The applied electric field on the LCD changes the alignment of liquid crystals that possess the characteristics of dielectric anisotropy and conducting anisotropy, and then the accompanied optical effects will be transformed into visional variation. A LCD employing a thin film transistor (TFT) as an active device is named TFT-LCD, which is good for low power consumption, is thin type, light weight and has low driving-voltage.

Figure 1A:
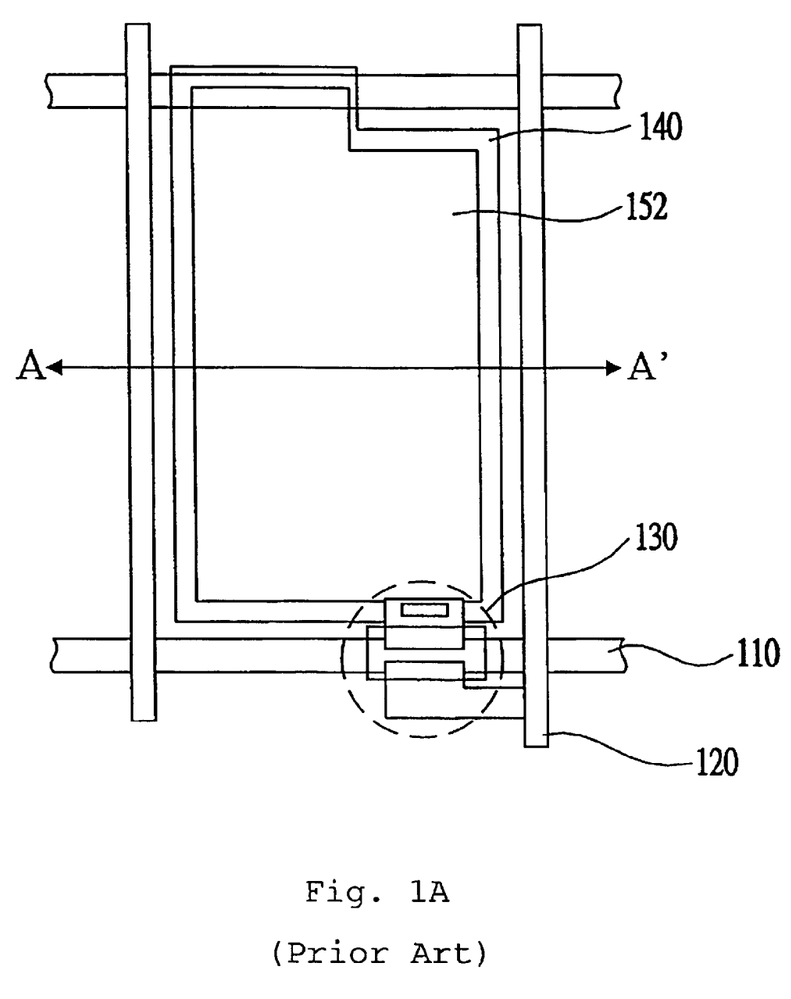
FIG. 1A is a top view showing a pixel structure of conventional TFT-LCD.
Figure 1B:
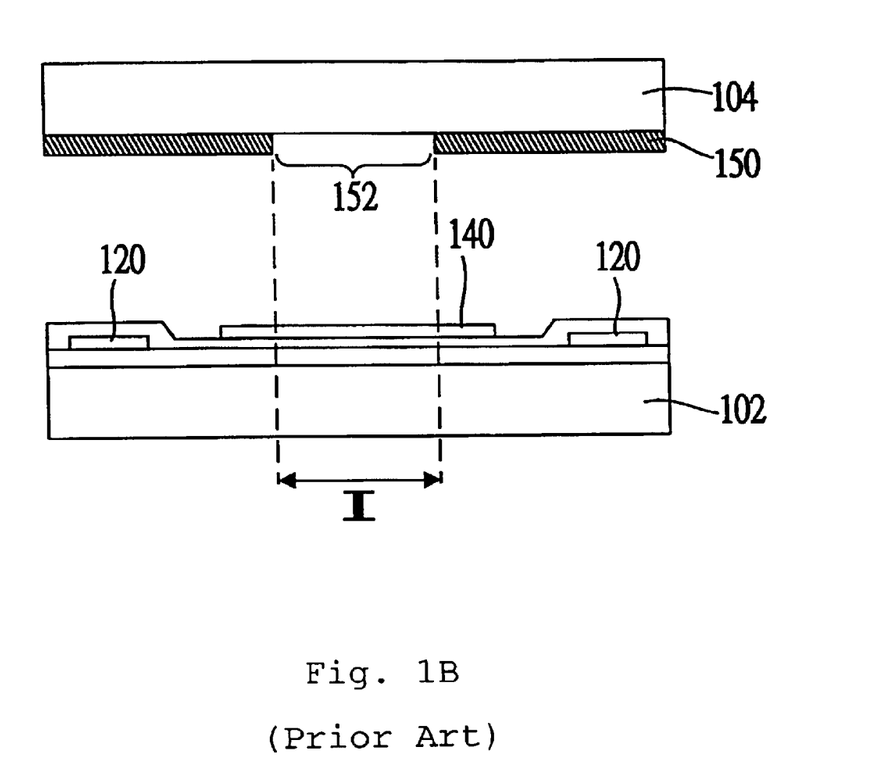
FIG. 1B is a sectional view showing the structure along the line A–A' of FIG. 1A.

FIG. 1A is a top view showing a pixel structure of conventional TFT-LCD. The scanning lines 110 and the signal lines 120 are arranged in a matrix form. Thin film transistor (TFT) 130 is disposed over the scanning line 110, and a pixel electrode 140 is electrically connected to the TFT 130. A black matrix 150 (as shown in FIG. 1B) has a window 152 pervious to light. FIG. 1B is a sectional view showing the structure along the line A–A' of FIG. 1A. The scanning line 110 (not shown in FIG. 1B), signal lines 120 and pixel electrode 140 are formed on the lower substrate 102. The black matrix 150 and the window 152 are formed on the upper substrate 104. Because the light passing through the edge of the pixel electrode 140 is shielded by the black matrix 150 to avoid light leakage, the transmittance area I is only just as broad as the window 152. In other words, the aperture ratio is reduced. Therefore, another proposal of improved pixel structure is disclosed.

Figure 2A:
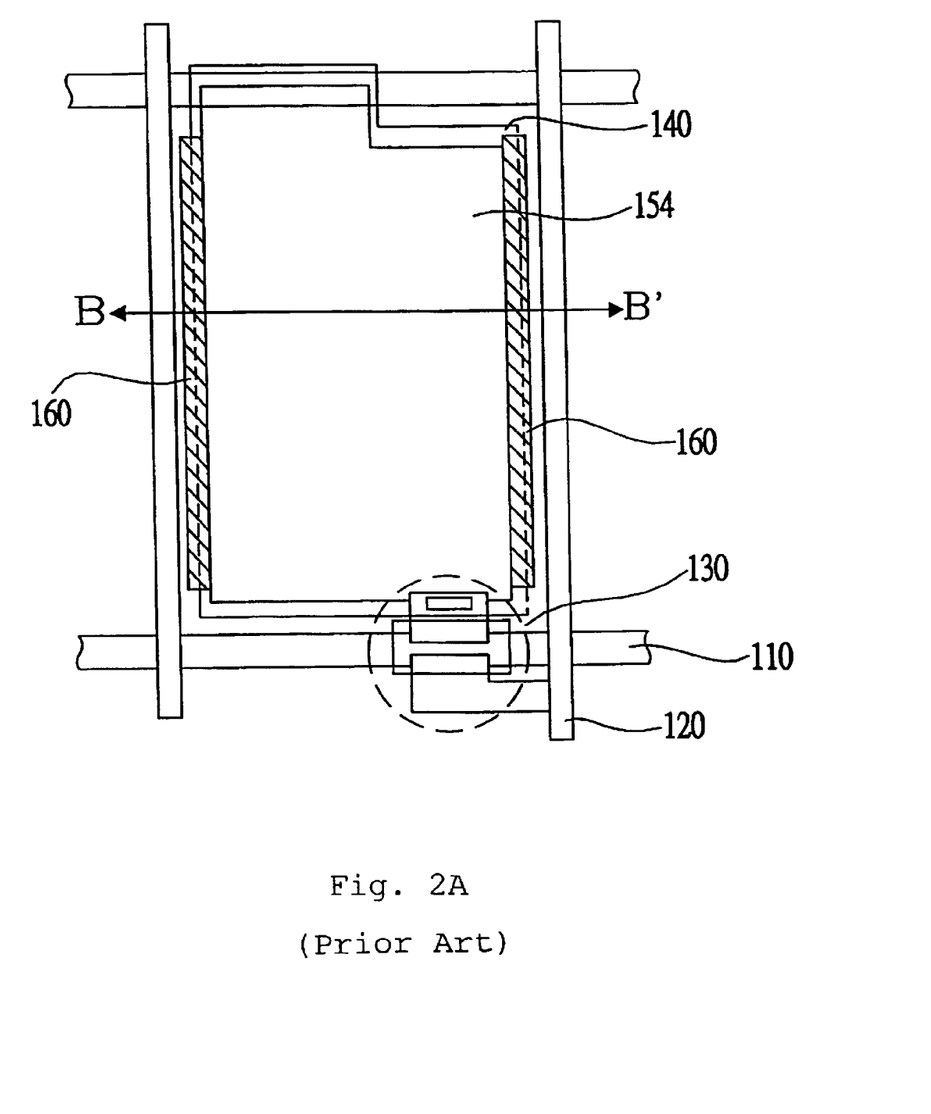
FIG. 2A is a top view showing another pixel structure of conventional TFT-LCD.
Figure 2B:
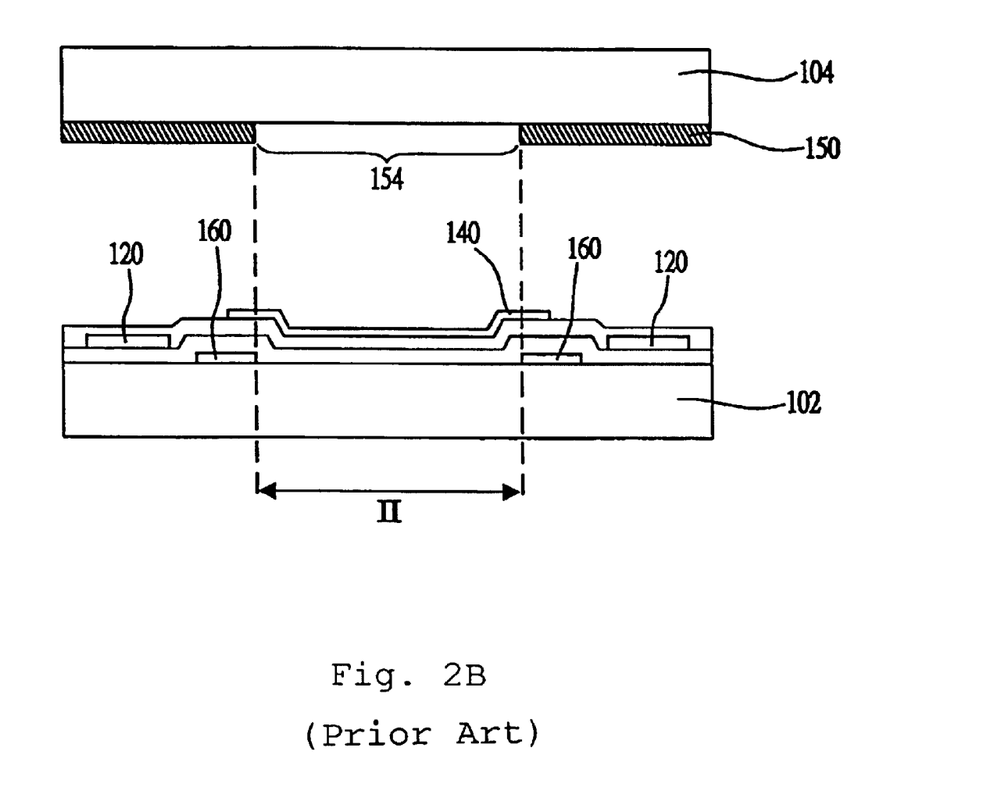
FIG. 2B is a sectional view showing the structure along the line B–B' of FIG. 2A.

FIG. 2A is a top view showing another pixel structure of conventional TFT-LCD. Two floating electrodes 160 are disposed on the lower substrate 102 (as shown in FIG. 2B) to shield the leakage light passing through from the edge of the pixel electrode 140 near the signal lines 120. FIG. 2B is a sectional view showing the structure along the line B–B' of FIG. 2A. Therefore, the window 154 of the black matrix 150 is broader than the window 152 shown in FIG. 1B. In another word, the transmittance area II is bigger than the transmittance area I (as shown in FIG. 1B) so the aperture ratio of pixel structure is improved. Moreover, the aperture ratio of the pixel structure shown in FIG. 2A is increased about 3% comparing to the pixel structure shown in FIG. 1A.

Figure 3:
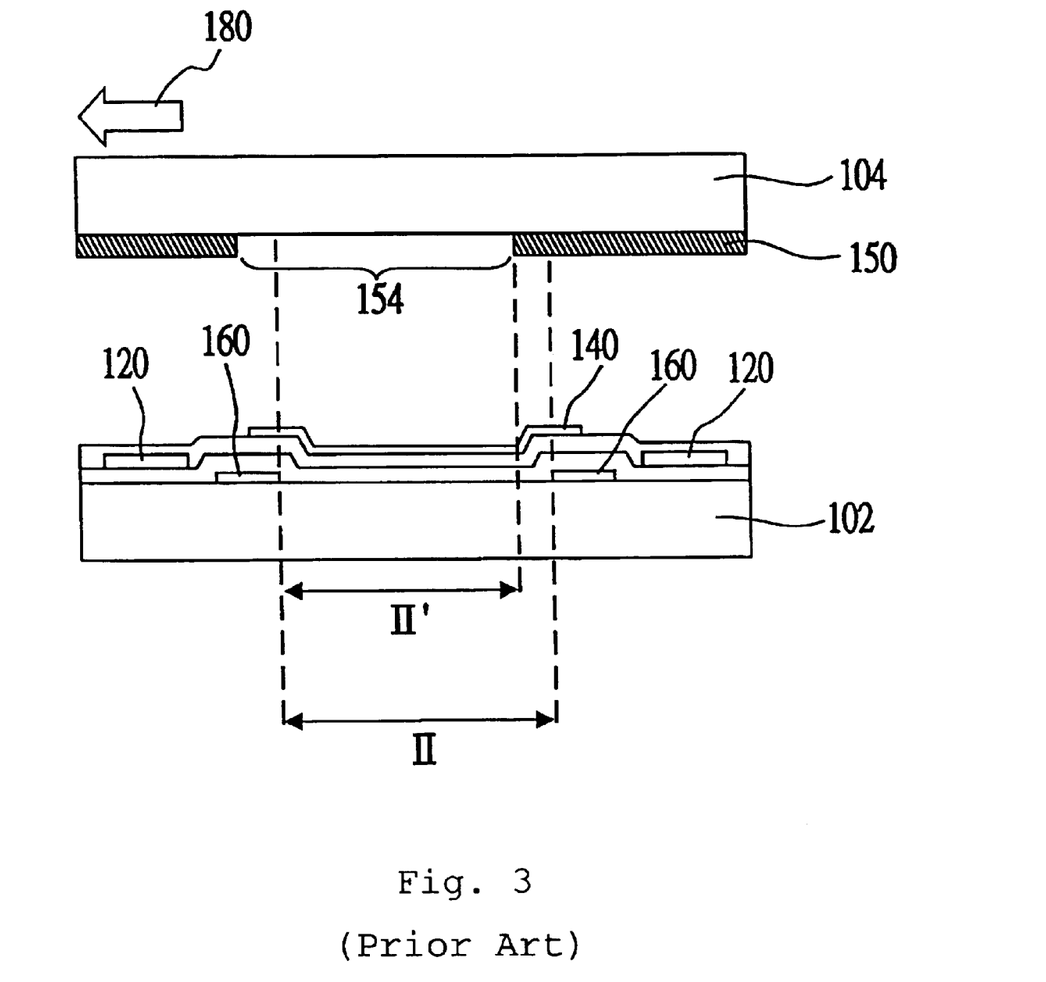
FIG. 3 is a sectional view showing a state of misalignment assembly of conventional TFT-LCD.

However, the aperture ratio of FIG. 2A is still decreased under a misalignment assembly process. FIG. 3 is a sectional view showing a state of misalignment assembly of conventional TFT-LCD. The upper substrate 104 is shifted along the direction of an arrow 180 under the misalignment assembly process, and the black matrix 150 following the upper substrate 104 is also shifted. Therefore, the transmittance area is decreased from II to II', and the improved aperture ratio is reduced again. According to actual experiment result, shifting the black matrix 150 1 μm decreases the aperture ratio 1% the aperture ratio 1%. For this reason, if the black matrix 150 is shifted more than 3 μm, the aperture ratio will be reduced more than 3%. Consequently, the improved aperture ratio will be canceled out completely.

SUMMARY OF THE INVENTION

The object of the present invention is to provide a TFT array substrate with high aperture ratio pixel structure to solve the problems caused by above conventional TFT-LCD.

This TFT array substrate with high aperture ratio pixel structure comprises a plurality of signal lines and a plurality of scanning lines formed on the substrate. Each paired and adjacent signal lines and each scanning line are arranged in a matrix form to define each pixel unit, each pixel unit includes at least two pixels, and the two pixels are abreast the paired and adjacent signal lines. Each pixel includes at least a thin film transistor disposed on the scanning line. A first floating electrode is disposed parallel to the signal lines and located on a side of the pixel adjacent to the signal line. A second floating electrode is located on the opposite side of the pixel and stretches over to the adjacent pixel. A pixel electrode is formed partially overlapping the first floating electrode and the second floating electrode, and is electrically connected to the thin film transistor.

According to this TFT array substrate of the present invention, each paired and adjacent signal lines and each scanning line are arranged in a matrix form to define each pixel unit, and each pixel unit includes at least two pixels. Therefore, at least one of the aperture ratios of the two pixels is fixed under a misalignment assembly process. For this reason, the whole aperture ratio of each pixel unit is still improved under the misalignment assembly process.

The other object of the present invention is to provide a thin film transistor liquid crystal display using above TFT array substrate, comprising a first substrate and a second substrate. A liquid crystal layer is disposed between the first substrate and the second substrate. A plurality of pixel units are formed on the first substrate, and includes a plurality of signal lines and a plurality of scanning lines. Each paired and adjacent signal lines and each scanning line are arranged in a matrix form to define each pixel unit. Each pixel unit includes at least two pixels, and the two pixels are abreast the paired and adjacent signal lines. Each pixel at least comprises a thin film transistor disposed on the scanning line. A first floating electrode is disposed parallel to the signal lines, and located on a side of the pixel adjacent to the signal line. A second floating electrode is located on the opposite side of the pixel and stretches over to the adjacent pixel. A pixel electrode is formed partially overlapping the first floating electrode and the second floating electrode, and is electrically connected to the thin film transistor. A plurality of black matrixes are formed on the second substrate, wherein the plurality of black matrixes have a plurality of windows, and each window corresponds to a space between the first two floating electrodes in each the pixel units.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 4A:
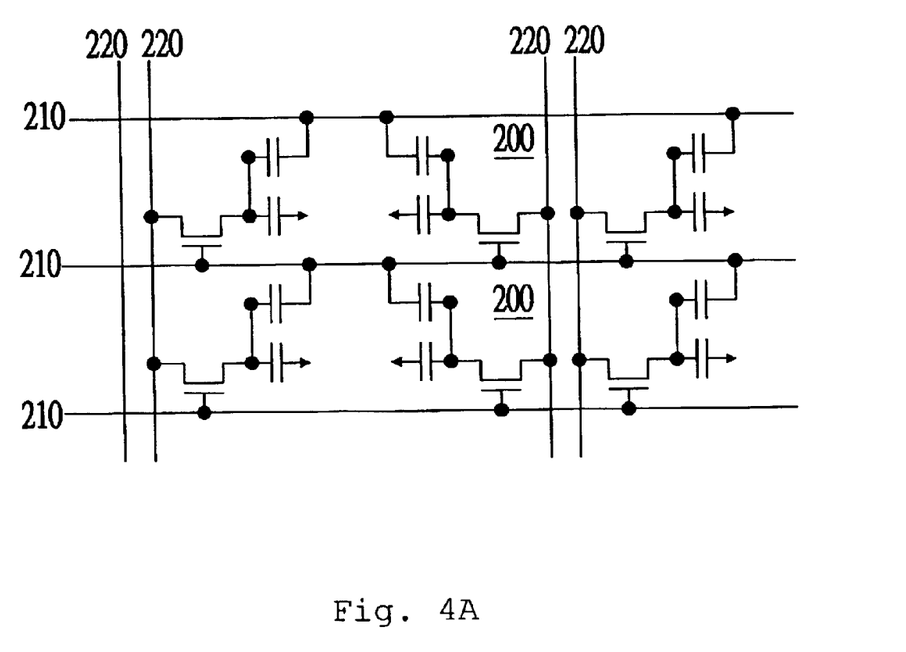
FIG. 4A is a circuit diagram showing a TFT array substrate of this invention.

FIG. 4A is a circuit diagram showing a TFT array substrate of this invention. This TFT array substrate of the present invention is composed of signal lines 220 and scanning lines 210 formed on the substrate. Each paired and adjacent signal lines 220 and each scanning line 210 are arranged in a matrix form to define each pixel unit 200.

Figure 4B:
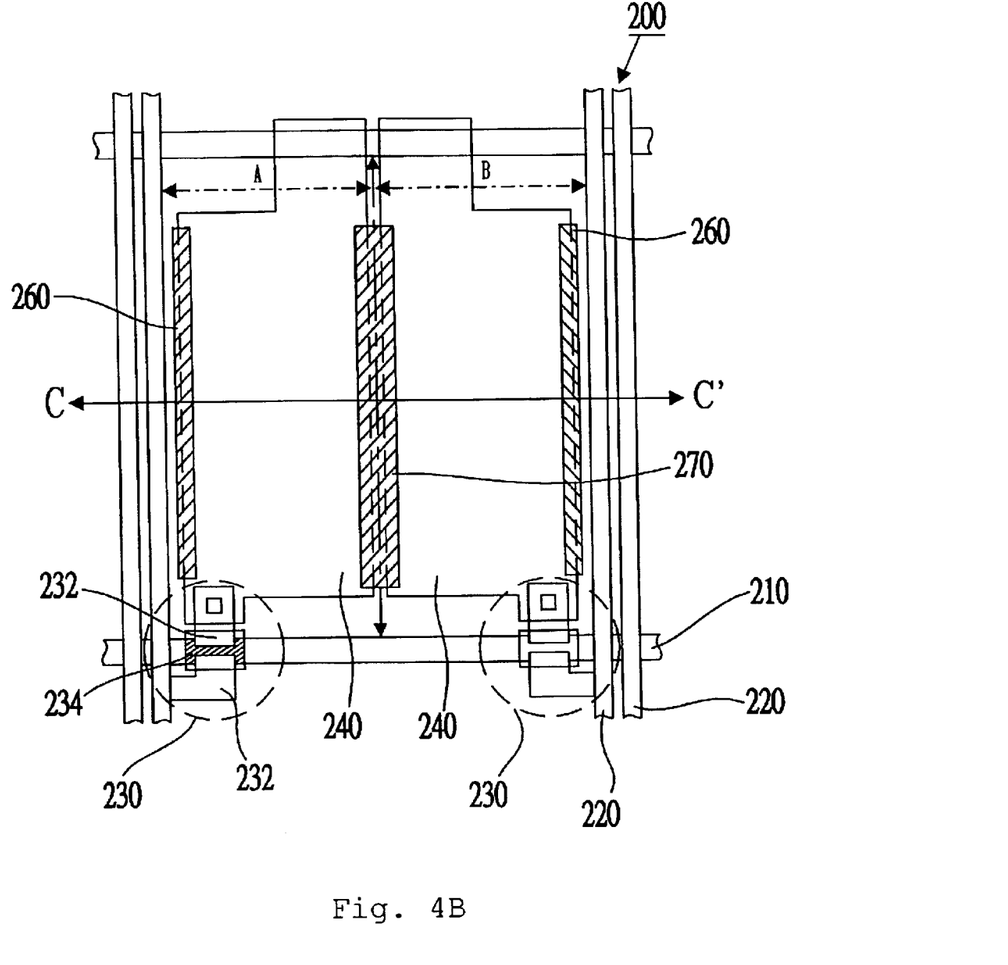
FIG. 4B is a top view showing a pixel unit of TFT array substrate of this invention.

FIG. 4B is a top view showing a pixel unit of TFT array substrate of this invention. The pixel unit 200 is composed of at least two pixels A and B expressed by dotted lines. The pixels A and B are abreast the is paired and adjacent signal lines 220. In this case, preferably, each pixel unit 200 is composed of two pixels (A and B). Each pixel (A or B) includes a thin film transistor 230, a first floating electrode 260, a second floating electrode 270, and a pixel electrode 240. The thin film transistor 230 is disposed on the scanning line 210, and is composed of a source/drain electrode 232 and a gate electrode 234 formed on the scanning line 210. The first floating electrode 260 and the second floating electrode 270 are formed on the pixels (A and B) and parallel to the signal lines 220, respectively. The first floating electrode 260 is disposed parallel to the signal lines 220 and located on a side of the pixel adjacent to the signal line 220. The second floating electrode 270 is located on the opposite side of the pixel and stretches over to the other pixel at the center of the pixel unit. Moreover, the pixel electrode 240 is formed partially overlapping the first floating electrode 260 and the second floating electrode 270, and is electrically connected to the thin film transistor 230 by a contact hole (not shown). In this case, preferably, the two thin film transistors 230 are located on the pixel unit 200 with symmetry as shown in FIG. 4B. However, the relative location of the thin film transistors 230 can also be modified according to the actual situation. The first floating electrode 260 and the second floating electrode 270, preferably, are composed of AlNd/Mo, Mo/AlNd/Mo, or MoW. The pixel electrode 240, preferably, is composed of indium tin oxide (ITO) or indium zinc oxide (IZO).

Figure 4C:
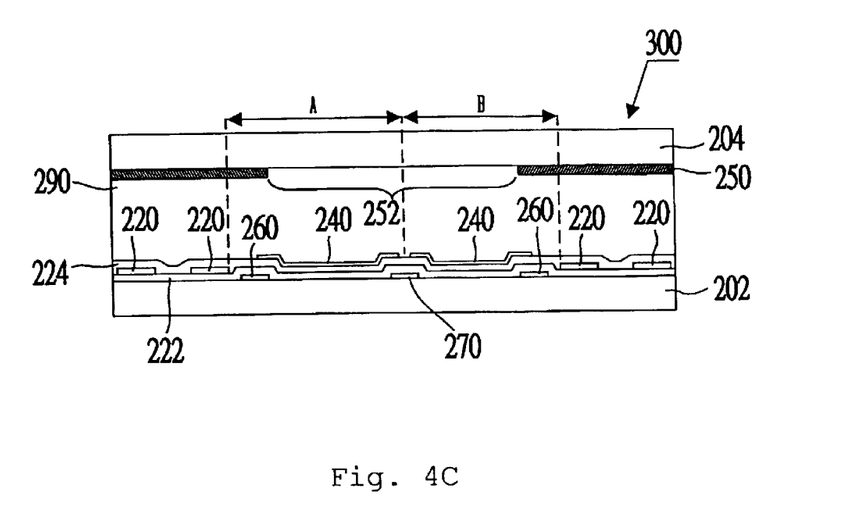
FIG. 4C is a sectional view showing the structure along the line C–C' of FIG. 4B.

FIG. 4C is a sectional view showing the structure along the line C–C' of FIG. 4B. A thin film transistor liquid crystal display 300 of this invention comprises a first substrate (above TFT array substrate) 202, a second substrate 204 and a liquid crystal layer 290. The liquid crystal layer 290 is disposed between the first substrate 202 and the second substrate 204. In this case, preferably, the fist substrate 202 and the is second substrate 204 are composed of transparent glass or quartz. Moreover, a black matrix 250 is formed on the second substrate 204. The black matrix 250 of each pixel unit 200 has a window 252, and the window 252 corresponds to the space of the first two floating electrodes 260 in the same pixel unit. In this case, preferably, the black matrix 250 is composed of Cr or black resin. Furthermore, an insulator layer 222 is formed over the first floating electrode 260 and the second floating electrode 270, and a passivation layer 224 is formed over the signal lines 220. In this case, preferably, the insulator layer 222 is composed of SiNx or SiOx/SiNx, and the passivation layer 224 is composed of SiNx.

Figure 5:
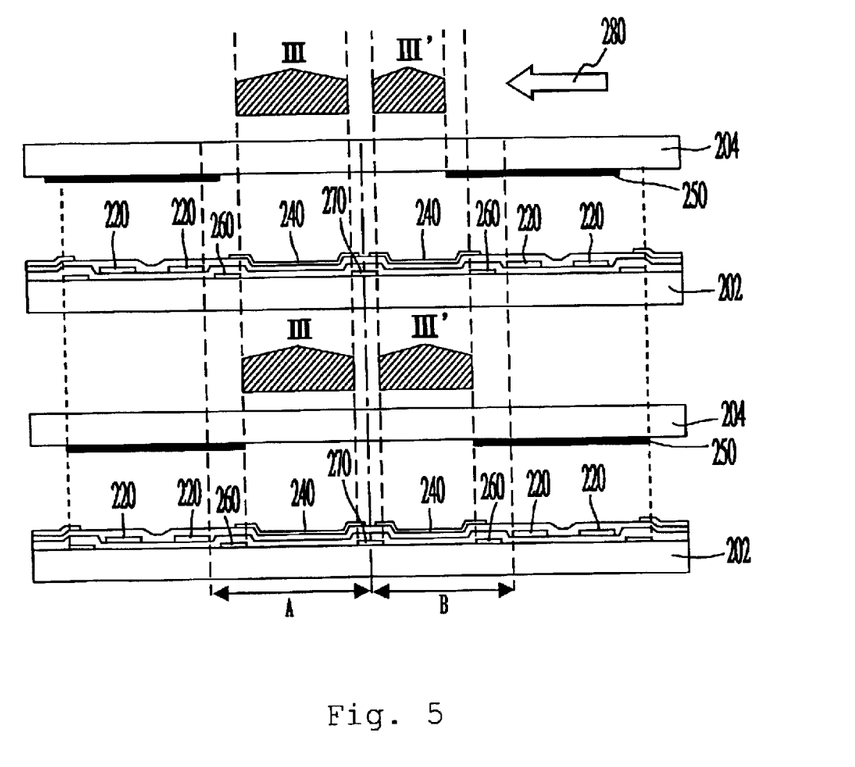
FIG. 5 is a sectional view showing a state of misalignment assembly of this invention.

FIG. 5 is a sectional view showing a state of misalignment assembly of this invention. Because the pixel unit 200 of this invention is composed of two abreast pixels (A and B), even if the black matrix 250 is shifted along the direction of a arrow 280 under the misalignment assembly process, one of the aperture ratio of the two abreast pixels is fixed. As shown in FIG. 5, the transmittance areas III have the same aperture ratio when the misalignment assembly process happens. On the other hand, the aperture ratio of the area III' is decreased after the misalignment assembly process. Comparing to the conventional design, if the black matrix is shifted about 1 μm in the pixel unit 200 of the present invention, only one of the aperture ratio of pixels is decreased about 1%. That is to say, the average aperture ratio of each pixel unit is only decreased about 0.5%. Therefore, the average aperture ratio of pixel structure of this invention is still improved even under the misalignment assembly process. According to this invention, a TFT liquid crystal display with high aperture ratio pixel structure is obtained.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A thin film transistor array substrate comprising a plurality of pixel units, each of the plurality of pixel units including:
    at least one paired and adjacent signal lines;
    at least one scanning line; and
    at least two pixels being abreast of the at least one paired and adjacent signal lines, each of the at least two pixels having:
        a thin film transistor disposed on the scanning line;
        a first floating electrode disposed on one side of the pixel;
        a second floating electrode disposed on the opposite side of the pixel, wherein the second floating electrode is stretched over to the adjacent pixel; and
        a pixel electrode formed partially overlapping the first floating electrode and the second floating electrode, the pixel electrode being electrically connected to the thin film transistor,
        wherein the first floating electrode and the second floating electrode are selected from a group consisting of AlNd/Mo, Mo/AlNd/Mo and MoW.

2. The thin film transistor array substrate as claimed in claim 1, wherein the thin film transistors are located on the pixel unit with symmetry.

3. The thin film transistor array substrate as claimed in claim 1, wherein the pixel electrode is selected from a group consisting of indium tin oxide (ITO) and indium zinc oxide (IZO).

4. A thin film transistor liquid crystal display, comprising:

a first substrate;

a second substrate;

a liquid crystal layer disposed between the first substrate and the second substrate;

a plurality of pixel units formed on the first substrate, each of the plurality of pixel units including:
  (1) at least one paired and adjacent signal lines;
  (2) at least one scanning line; and
  (3) at least two pixels being abreast of the at least one paired and adjacent signal lines, each of the at least two pixels having:
    (a) a thin film transistor disposed on the scanning line;
    (b) a first floating electrode disposed on one side of the pixel;
    (c) a second floating electrode disposed on the opposite side of the pixel; and
    (d) a pixel electrode formed partially overlapping the first floating electrode and the second floating electrode, the pixel electrode being electrically connected to the thin film transistor,
    wherein the first floating electrode and the second floating electrode are selected from a group consisting of AlNd/Mo, Mo/AlNd/Mo and MoW; and a plurality of black matrixes formed on the second substrate, wherein the plurality of black matrixes have a plurality of windows, and each of the plurality of windows corresponds to a space between the first floating electrodes in each of the pixel units.

5. The thin film transistor liquid crystal display as claimed in claim 4, wherein the thin film transistors are located on the pixel unit with symmetry.

6. The thin film transistor liquid crystal display as claimed in claim 4, wherein the pixel electrode is selected from a group consisting of indium tin oxide (ITO) and indium zine oxide (IZO).

7. The thin film transistor liquid crystal display as claimed in claim 4, wherein the black matrix is selected from a group consisting of Cr and resin.

8. A thin film transistor array substrate, comprising:

a plurality of paired and adjacent signal lines;

a plurality of scanning lines; and a plurality of pixels, wherein each at least two of the plurality of pixels are dividedly formed between neighboring paired and adjacent signal lines and neighboring scanning lines, the at least two pixels including:
  at least two thin film transistors disposed on the scanning line;
  at least two first floating electrodes disposed on edges of the pixels;
  a second floating electrode disposed on a junction portion of the pixels; and
  at least two pixel electrodes formed partially overlapping with the first floating electrodes and the second floating electrode, the pixel electrodes being electrically connected to the thin film transistors,
  wherein the first floating electrodes and the second floating electrode are selected from a group consisting of AlNd/Mo, Mo/AlNd/Mo and MoW.

9. The thin film transistor array substrate as claimed in claim 8, wherein the thin film transistors are located on the pixel unit with symmetry.

10. The thin film transistor array substrate as claimed in claim 8, wherein the pixel electrode is selected from a group consisting of indium tin oxide (ITO) and indium zine oxide (IZO).

11. A thin film transistor liquid crystal display, comprising:

a first substrate;

a second substrate;

a liquid crystal layer disposed between the first substrate and the second substrate;

a plurality of paired and adjacent signal lines formed on the first substrate;

a plurality of scanning lines formed on the first substrate; and a plurality of pixels formed on the first substrate, wherein each at least two of the plurality of pixels are dividedly formed between neighboring paired and adjacent signal lines and neighboring scanning lines, and the at least two pixels include:
  at least two thin film transistors disposed on the scanning line;
  at least two first floating electrodes disposed on edges of the pixels;
  a second floating electrode disposed on a junction portion of the pixels; and
  at least two pixels electrodes formed partially overlapping with the first floating electrode and the second floating electrode, the pixel electrodes being electrically connected to the thin film transistors,
  wherein the first floating electrodes and the second floating electrode are selected from a group consisting of AlNd/Mo, Mo/AlNd/Mo and MoW; and a plurality of black matrixes formed on the second substrate, wherein the plurality of black matrixes have a plurality of windows, and each of the plurality of windows corresponds to a space between the first floating electrodes in each of the pixel units.

12. The thin film transistor liquid crystal display as claimed in claim 11, wherein the thin film transistors are located on the pixel unit with symmetry.

13. The thin film transistor liquid crystal display as claimed in claim 11, wherein the pixel electrode is selected from a group consisting of indium tin oxide (ITO) and indium zine oxide (IZO).

14. The thin film transistor liquid crystal display as claimed in claim 11, wherein the black matrix is selected from a group consisting of Cr and resin.

* * * * *